United States Patent
Ueki et al.

(10) Patent No.: US 8,932,767 B2
(45) Date of Patent: Jan. 13, 2015

(54) NONAQUEOUS ELECTROLYTE LITHIUM SECONDARY BATTERY

(75) Inventors: Tomoyoshi Ueki, Toyota (JP); Harunari Shimamura, Moriguchi (JP); Yusuke Fukumoto, Moriguchi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 60 days.

(21) Appl. No.: 13/879,034

(22) PCT Filed: Oct. 13, 2010

(86) PCT No.: PCT/JP2010/067978
§ 371 (c)(1),
(2), (4) Date: Apr. 12, 2013

(87) PCT Pub. No.: WO2012/049748
PCT Pub. Date: Apr. 19, 2012

(65) Prior Publication Data
US 2013/0216893 A1    Aug. 22, 2013

(51) Int. Cl.
*H01M 2/14*    (2006.01)
*H01M 2/16*    (2006.01)

(52) U.S. Cl.
USPC ............... 429/251; 429/247; 429/129

(58) Field of Classification Search
None
See application file for complete search history.

(56) References Cited

U.S. PATENT DOCUMENTS

| | | | |
|---|---|---|---|
| 2004/0106037 A1* | 6/2004 | Cho et al. | 429/144 |
| 2006/0286444 A1* | 12/2006 | Nishino et al. | 429/120 |
| 2007/0072083 A1* | 3/2007 | Ikuta et al. | 429/246 |
| 2007/0254209 A1 | 11/2007 | Baba et al. | |
| 2008/0248394 A1* | 10/2008 | Inoue et al. | 429/232 |
| 2010/0173187 A1 | 7/2010 | Nishikawa et al. | |
| 2010/0178544 A1 | 7/2010 | Nishikawa | |

FOREIGN PATENT DOCUMENTS

| | | |
|---|---|---|
| CN | 101038960 | 9/2007 |
| CN | 101689624 | 3/2010 |
| KR | 10-2010-0038196 | 4/2010 |
| WO | WO 2008/149895 A1 | 12/2008 |
| WO | WO 2008/156033 A1 | 12/2008 |

\* cited by examiner

*Primary Examiner* — Cynthia K. Walls
(74) *Attorney, Agent, or Firm* — Finnegan, Henderson, Farabow, Garrett & Dunner, LLP

(57) ABSTRACT

A nonaqueous electrolyte lithium secondary battery obtained by the present invention has a separator and a porous layer which contains an inorganic filler and a binder and which is formed on the separator, wherein a thickness of the separator ranges from 12 μm to 18 μm, a porosity of the separator ranges from 52% to 67%, a thickness of the porous layer ranges from 3 μm to 15 μm, a porosity of the porous layer ranges from 44% to 70%, and the porous layer-attached separator exhibits a film resistance equal to or lower than 1.35 Ω·cm² when impregnated with an electrolyte solution.

5 Claims, 7 Drawing Sheets

NONAQUEOUS ELECTROLYTE LITHIUM SECONDARY BATTERY

CROSS-REFERENCE TO RELATED APPLICATIONS

This application is a national phase application of International Application No. PCT/JP2010/067978, filed Oct. 13, 2010, the content of which is incorporated herein by reference.

TECHNICAL FIELD

The present invention relates to a nonaqueous electrolyte lithium secondary battery and, more specifically, to a nonaqueous electrolyte lithium secondary battery having a porous layer which includes an inorganic filler and a binder on a surface of a separator.

BACKGROUND ART

In recent years, lithium ion batteries, nickel hydride batteries, and other secondary batteries are growing in importance as vehicle-mounted power supplies and as power supplies for personal computers and mobile phones. In particular, since lithium ion batteries are lightweight and capable of producing high energy density, they are expected to be favorably used as high-output vehicle-mounted power supplies. In a typical configuration of such a lithium secondary battery, a separator is interposed between a positive electrode and a negative electrode to prevent short circuit between the positive and negative electrodes. A polyolefin porous film in which pores are formed in a large number is used as the separator in order to secure ion permeability between the positive electrode and the negative electrode.

However, a polyolefin porous film becomes susceptible to thermal contraction or fracture when the temperature inside a battery rises and, as a result, an internal short circuit (short) may conceivably occur. In order to prevent such an occurrence of a short circuit, the formation of a heat-resistant porous layer on a surface of a separator is being evaluated. For example, Patent Literature 1 discloses a nonaqueous secondary battery separator in which a heat-resistant porous layer is formed on a surface of a polyolefin microporous membrane.

CITATION LIST

Patent Literature

Patent Literature 1: WO 2008/149895

There are some applications of lithium secondary batteries in which a lithium secondary battery is envisioned to be used in a state in which high-rate discharge (rapid discharge) is repetitively performed. A lithium secondary battery used as a motive power source of a vehicle (such as a lithium secondary battery mounted on a hybrid vehicle that uses a combination of a lithium secondary battery and another motive power source having a different operating principle such as an internal combustion engine as a motive power source) is a representative example of a lithium secondary battery that is envisioned to be used in such a manner. However, even though typical conventional lithium secondary batteries demonstrate relatively high endurance with respect to a low-rate charge-discharge cycle, they are known to be susceptible to deterioration of performance (such as an increase in battery resistance) with respect to charge-discharge patterns in which high-rate change and discharge are repetitively performed.

Patent Literature 1 discloses a technique for a nonaqueous secondary battery separator having a heat-resistant porous layer formed on a surface of a polyolefin microporous membrane, wherein a porosity of the separator is set from 35 to 50% in order to optimize a film resistance of the separator and, accordingly, improve charge-discharge characteristics of a battery. However, with the disclosed technique, although the charge-discharge characteristics of the battery can be improved, endurance with respect to charge-discharge patterns in which high-rate charge and discharge (for example, rapid charge and discharge at a level required for a lithium secondary battery or the like to be used as a vehicle motive power source) are repetitively performed cannot be improved.

SUMMARY OF INVENTION

The present invention has been made in consideration of the above, and a main object of the present invention is to provide a nonaqueous electrolyte lithium secondary battery with enhanced endurance with respect to high-rate charge and discharge. Another object of the present invention is to provide a suitable production method for a nonaqueous electrolyte lithium secondary battery with such a performance.

A nonaqueous electrolyte lithium secondary battery provided by the present invention includes a separator and a porous layer which is formed on the separator and which contains an inorganic filler and a binder, wherein an average thickness of the separator ranges from 12 μm to 18 μm, a porosity of the separator ranges from 52% to 67%, an average thickness of the porous layer ranges from 3 μm to 15 μm, a porosity of the porous layer ranges from 44% to 70%, and the porous layer-attached separator exhibits a film resistance equal to or lower than 1.35 $\Omega \cdot cm^2$ when impregnated with an electrolyte solution.

With a porous layer-attached separator satisfying all of the conditions described above, both the porous layer and the separator have favorable ion permeability, and an electrical contact between a positive electrode and a negative electrode can be reliably prevented even when heat is generated by the battery due to an overcharge or the like. Therefore, by adopting such a porous layer-attached separator, an optimal nonaqueous electrolyte lithium secondary battery with high safety and high endurance with respect to high-rate charge and discharge can be obtained.

Favorably, the separator is made of a porous polyethylene resin. In addition, favorably, the inorganic filler is alumina or hydrated alumina. Since these metallic compounds have a relatively high Mohs hardness, a mechanical strength of the porous layer can be enhanced by using such metallic compounds.

In addition, the present invention provides a method of producing any one of the nonaqueous electrolyte lithium secondary batteries disclosed herein. The production method includes: a step coating a separator with a slurry containing an inorganic filler and a binder; a step of obtaining a porous layer-attached separator in which a porous layer including the inorganic filler and the binder is formed on the separator by drying the slurry coating material with drying air; and a step of constructing a lithium secondary battery using the porous layer-attached separator, wherein a solid content of the slurry is set from 35% by mass to 58% by mass, and the drying of the slurry coating material is performed under a condition where a drying temperature ranges from 40° C. to 80° C. and a drying air speed ranges from 13 m/s to 27 m/s.

With the production method according to the present invention, since the solid content of the slurry is set from 35% by mass to 58% by mass and the drying of the slurry coating material is performed under predetermined conditions, the slurry coating material can be dried efficiently. Therefore, even when a porous layer is formed on the separator, the inorganic filler in the porous layer can be appropriately prevented from penetrating into holes of the separator and a high porosity of the separator can be maintained. By using such a porous layer-attached separator, an optimal lithium secondary battery with high endurance with respect to high-rate charge and discharge can be constructed.

In a favorable aspect of the nonaqueous electrolyte lithium secondary battery production method disclosed herein, a proportion of the binder in the slurry ranges from 1.1% by mass to 3.6% by mass when 100% by mass represents a total solid content of the slurry. In this case, the slurry coating material can be dried even more efficiently.

DESCRIPTION OF EMBODIMENTS

Figure 1:
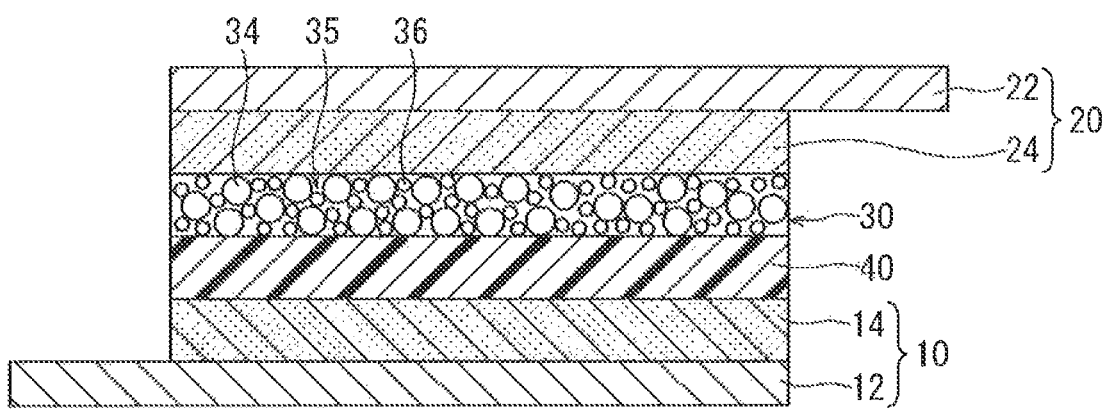
FIG. 1 is a sectional view schematically showing a lithium secondary battery according to an embodiment of the present invention.

Hereinafter, an embodiment according to the present invention will be described with reference to the drawings. In the following drawings, members and portions that produce same effects will be described using the same reference characters. It should be noted that dimensional relationships (length, width, thickness, and the like) shown in the respective drawings do not reflect actual dimensional relationships. In addition, any technological matters not specifically mentioned in the present specification but necessary for the implementation of the present invention (for example, a configuration and a production method of an electrode body comprising a positive electrode and a negative electrode, a configuration and a production method of a separator or an electrolyte, and general techniques related to the construction of a nonaqueous electrolyte lithium secondary battery and other batteries) can be construed as design items for a person skilled in the art on the basis of prior art in the relevant field.

FIG. 1 shows a schematic configuration of a lithium secondary battery according to an embodiment of the present invention. The lithium secondary battery comprises a separator 40 and a porous layer 30 which is formed on the separator 40 and which includes an inorganic filler 34 and a binder 36. In addition, (1) a thickness of the separator ranges from 12 μm to 18 μm,
(2) a porosity of the separator ranges from 52% to 67%,
(3) a thickness of the porous layer ranges from 3 μm to 15 μm,
(4) a porosity of the porous layer ranges from 44% to 70%, and
(5) the porous layer-attached separator has a film resistance equal to or lower than $1.35\ \Omega \cdot cm^2$ when impregnated with an electrolyte solution.

With a porous layer-attached separator satisfying all of the conditions (1) to (5) listed above, both the porous layer and the separator have favorable ion permeability, and an electrical contact between a positive electrode and a negative electrode can be reliably prevented even when heat is generated by the battery due to an overcharge or the like. Therefore, by adopting such a porous layer-attached separator, an optimal nonaqueous electrolyte lithium secondary battery with high safety and high endurance with respect to high-rate charge and discharge can be obtained.

In the separator 40 of the porous layer-attached separator disclosed herein, a large number of pores are formed, whereby connections among the pores enable passage of an electrolyte solution and ions. In addition, the separator is designed so that the pores close and the separator becomes non-porous (shuts down) when heat is generated by the battery due to overcharge or the like to be able to prevent an electrical contact between the positive electrode and the negative electrode.

As a porous resin used in the separator, porous resins which are heat-resistant and which are electrochemically stable within a range of use of the battery are favorable. Examples of such resin materials include porous polyolefin-based resin. Preferable examples of porous polyolefin-based resin include a porous polyolefin-based resin with a single-layer structure of porous polyethylene (PE) and a porous polyolefin-based resin with a triple-layer structure constituted by polypropylene (PP)/polyethylene (PE)/polypropylene (PP).

A porosity of the separator according to the porous layer-attached separator disclosed herein ranges from 52 to 67%. An excessively high porosity of the separator may prevent the shutdown function from working during an overcharge or may result in insufficient strength of the separator. On the other hand, an excessively low porosity of the separator may prevent the separator from securing sufficient ion permeability. The porosity of the separator ranges from approximately 52 to 67%, favorably ranges from 53 to 65%, more favorably ranges from 57 to 63%, and even more favorably ranges from 60 to 62%. By having a porosity set within such a predetermined range, both superior shutdown performance and sufficient ion permeability can be achieved.

In addition, while an average thickness of the separator can be appropriately selected depending on the intended use, normally, the average thickness is favorably set equal to or less than 18 μm where preferable ion permeability is obtained. For example, the average thickness appropriately ranges from 12 to 18 μm, more favorably ranges from 12 to 17 μm, even more favorably ranges from 12 to 16 μm, and particularly favorably ranges from 14 to 16 μm. Preferable examples of the separator disclosed herein include a separator with a porosity ranging from 52 to 67% and a thickness ranging from 12 to 18 μm, a separator with a porosity ranging from 53 to 66% and a thickness ranging from 14 to 17 μm, a separator with a porosity ranging from 57 to 65% and a thickness ranging from 14 to 16 μm, and a separator with a porosity ranging from 60 to 65% and a thickness ranging from 14 to 16 μm. By having both a porosity and a thickness within such predetermined ranges, a separator can be realized which achieves both superior shutdown performance and sufficient ion permeability at conventionally unattainable high levels.

Moreover, the porosity of the separator can be controlled by arbitrarily adjusting an amount, a draw ratio, or the like of a plasticizer used in the separator. For example, the porosity of the separator can be ascertained by $(1-W/\rho V) \times 100$, where W denotes a mass of the separator, V denotes an apparent volume V of the separator, and $\rho$ denotes a true density of the separator (a value obtained by dividing the mass W by an actual volume which does not contain holes). In addition, the porosity can also be calculated using a mercury porosimeter. For the average thickness of the separator, for example, an average value of thicknesses measured using a micrometer at 30 points on a 5 cm by 7 cm separator can be used. Alternatively, the thickness can be ascertained from a sectional SEM (scanning electron microscope) photograph of the separator.

Next, the porous layer 30 according to the porous layer-attached separator disclosed herein will be described. In the present embodiment, the porous layer 30 according to the porous layer-attached separator is formed on a surface of the separator 40 which opposes a negative electrode sheet 20. The porous layer 30 is constituted by the inorganic filler 34 and the binder 36. The binder 36 provides binding among the inorganic fillers 34 and between the inorganic filler 34 and the separator 40. The porous layer 30 has a large number of pores 35 in a portion not bound by the binder 36, and connections among the pores 35 enable passage of an electrolyte solution and ions inside the porous layer 30. In addition, the porous layer 30 is heat-resistant to a degree where the porous layer 30 does not melt in a higher temperature range (for example, 150° C. or higher) than a melting point of the separator 40. Due to the presence of the porous layer 30, an electrical contact between the positive electrode and the negative electrode can be avoided even in a case where the separator deforms (thermal contraction or melting) when heat is generated by the battery.

As the inorganic filler used in the porous layer, inorganic fillers which are heat-resistant and which are electrochemically stable within a range of use of the battery are favorable. Examples of such an inorganic filler include metallic compounds such as alumina ($Al_2O_3$), hydrated alumina (for example, boehmite ($Al_2O_3 \cdot H_2O$)), magnesium hydroxide ($Mg(OH)_2$), and magnesium carbonate ($MgCO_3$). One or two or more of these metallic compound materials can be used. In particular, alumina or hydrated alumina is favorable due to a high Mohs hardness and an ability to enhance a mechanical strength of a porous layer constructed using alumina or hydrated alumina.

The binder used in the porous layer is for binding among the inorganic fillers. Materials that constitute the binder are not particularly limited and a wide variety of materials can be used. Preferable examples include acrylic resins. As an acrylic resin, a homopolymer in which one of the following monomers is polymerized may be favorably used: acrylic acid, methacrylic acid, acrylamide, methacrylamide, 2-hydroxyethyl acrylate, 2-hydroxyethyl methacrylate, methacrylate, methyl methacrylate, ethylhexyl acrylate, butylacrylate, and the like. Alternatively, the acrylic resin may be a copolymer in which two or more of the monomers described above are polymerized. Furthermore, a mixture of two or more of the homopolymers and copolymers described above can be adopted. In addition to the acrylic resins described above, polyvinylidene fluoride, polytetrafluoroethylene (PTFE), polyacrylonitrile, polymethylmethacrylate, and the like can also be used.

Although not particularly limited, a proportion of the inorganic filler in the entire porous layer is favorably equal to or greater than approximately 90% by mass (typically, from 95% by mass to 99% by mass) and more favorably ranges from approximately 97% by mass to 99% by mass. In addition, a proportion of the binder in the porous layer is favorably equal to or lower than approximately 7% by mass and more favorably equal to or lower than approximately 5% by mass (for example, from approximately 0.5% by mass to 3% by mass). Furthermore, when there are constituents (such as a thickener) that form the porous layer other than the inorganic filler and the binder, a total content of such arbitrary constituents is favorably set equal to or lower than approximately 3% by mass and more favorably set equal to or lower than approximately 2% by mass (for example, from approximately 0.5% by mass to 1% by mass).

The porosity of the porous layer according to the porous layer-attached separator disclosed herein ranges from 44 to 70%. An excessively high porosity of the porous layer may negate an effect of preventing an electrical contact between the positive electrode and the negative electrode when a deformation of the separator occurs or may result in insufficient strength of the porous layer. On the other hand, an excessively low porosity of the porous layer may prevent the porous layer from securing sufficient ion permeability. The porosity of the porous layer ranges from approximately 44 to 70%, favorably ranges from 47 to 68%, more favorably ranges from 49 to 65%, even more favorably ranges from 52 to 62%, and particularly favorably ranges from 52 to 60%. By having a porosity set within such a predetermined range, both a superior effect of preventing an electrical contact between the positive electrode and the negative electrode and sufficient ion permeability can be achieved.

In addition, while an average thickness of the porous layer can be appropriately selected depending on the intended use, normally, the average thickness is favorably set equal to or less than 15 μm where preferable ion permeability is obtained. For example, the average thickness appropriately ranges from 3 to 15 μm, more favorably ranges from 4 to 11 μm, even more favorably ranges from 6 to 10 μm, and particularly favorably ranges from 7 to 9 μm. Preferable examples of the porous layer disclosed herein include a porous layer with a porosity ranging from 44 to 70% and a film thickness ranging from 3 to 15 μm, a porous layer with a porosity ranging from 45 to 68% and a film thickness ranging from 3 to 11 μm, a porous layer with a porosity ranging from 49 to 65% and a film thickness ranging from 6 to μm, and a porous layer with a porosity ranging from 52% to 62% and a film thickness ranging from 7 to 9.5 μm. By having both a porosity and a film thickness within such predetermined ranges, a porous layer can be realized which achieves both a superior effect of preventing an electrical contact between the positive electrode and the negative electrode and sufficient ion permeability at conventionally unattainable high levels.

Moreover, the porosity of the porous layer can be controlled by arbitrarily adjusting a solid content of the slurry or an amount of the binder used for forming the porous layer and by adjusting drying conditions applied when drying the slurry. The porosity of the porous layer can be calculated by $(1-W/\rho V) \times 100$, where W denotes a mass of the porous layer, V denotes an apparent volume of the porous layer, and $\rho$ denotes a true density (a theoretical density) of materials constituting the porous layer. For the average thickness of the porous layer, first, thicknesses are measured using a micrometer at 30 points on a 5 cm by 7 cm porous layer-attached separator, whereby an average value of the thicknesses is calculated as a thickness of the porous layer-attached separator. Next, the porous layer-attached separator is wetted by ethanol to remove the porous layer, a thickness of the separator from which the porous layer has been removed is measured and obtained by the same method, and a value obtained by subtracting an average thickness of the separator from an average thickness of the porous layer-attached separator may be adopted as the thickness of the porous layer. Alternatively, the thickness can be ascertained from a sectional SEM (scanning electron microscope) photograph of the porous layer-attached separator.

The porous layer-attached separator disclosed herein is capable of providing both the porous layer and the separator with favorable ion permeability as described earlier, and is capable of indicating an extremely low film resistance value when the porous layer-attached separator is impregnated with an electrolyte solution. For example, the film resistance when the porous layer-attached separator is impregnated with an electrolyte solution is normally suitably equal to or lower than 1.35 $\Omega \cdot cm^2$, favorably equal to or lower than 1.3 $\Omega \cdot cm^2$, more favorably equal to or lower than 1.2 $\Omega \cdot cm^2$, still more favorably equal to or lower than 1.0 $\Omega \cdot cm^2$, and particularly favorably equal to or lower than 0.9 $\Omega \cdot cm^2$ (for example, from 0.7 to 0.9 $\Omega \cdot cm^2$). By adopting such a porous layer-attached separator, an optimal nonaqueous electrolyte lithium secondary battery with high safety and high endurance with respect to high-rate charge and discharge can be obtained.

Next, a method of producing a porous layer-attached separator according to the present invention will be described.

This production method comprises:
(A) a step of coating a separator with a slurry containing an inorganic filler and a binder;
(B) a step of obtaining a porous layer-attached separator in which a porous layer is formed on the separator by drying the slurry coating material with drying air; and
(C) a step of constructing a lithium secondary battery using the porous layer-attached separator.

Figure 2:
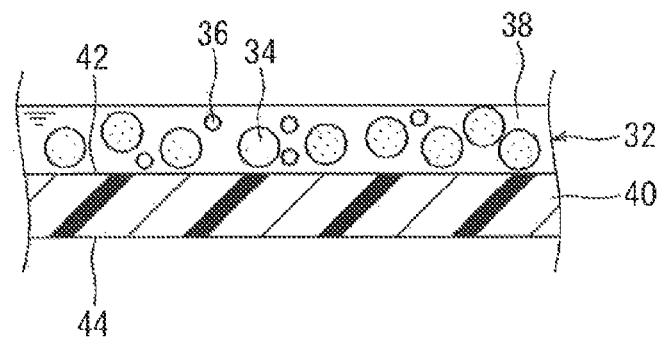
FIG. 2 is a sectional view schematically showing a production process of a lithium secondary battery according to an embodiment of the present invention.

First, in step (A), as shown in FIG. 2, the separator 40 is coated with a slurry 32 prepared by diffusing the inorganic filler 34 and the binder 36 in a solvent 38. For the inorganic filler and the binder used, any available material among the inorganic fillers and binders described with respect to the porous layer-attached separator according to the present configuration may be used. Commercial products may be used as-is. In particular, in order to set the porosity of the porous layer within a predetermined range, the inorganic filler favorably has an average particle diameter that falls within 0.2 μm to 2 μm (more favorably, within 0.3 μm to 1.5 μm). In addition, as described with respect to the porous layer-attached separator according to the present configuration, the separator used has a thickness which ranges from 12 to 18 μm, favorably ranges from 12 to 17 μm, more favorably ranges from 12 to 16 μm, and particularly favorably ranges from 12 to 15 μm, and has a porosity which ranges from 52 to 67%, favorably ranges from 53% to 65%, more favorably ranges from 57% to 63%, and particularly favorably ranges from 60% to 62%.

The solvent used in the slurry described above may be an organic solvent such as N-methylpyrrolidone (NMP), pyrrolidone, methyl ethyl ketone, methyl isobutyl ketone, cyclohexanone, toluene, dimethylformamide, and dimethylacetamide, or a combination of two or more of these organic solvents. Alternatively, water or a water-based mixed solvent may be used. As a solvent other than water which constitutes such a mixed solvent, one or two or more organic solvents (lower alcohol, lower ketone, or the like) which can be homogeneously mixed with water can be appropriately selected and used.

Moreover, in addition to the inorganic filler and the binder, the slurry described above can contain one or two or more materials to be used when necessary. Examples of such materials include a polymer that functions as a thickener of the slurry. As a polymer that functions as a thickener, for example, carboxymethyl cellulose (CMC) may be favorably used.

Figure 3:
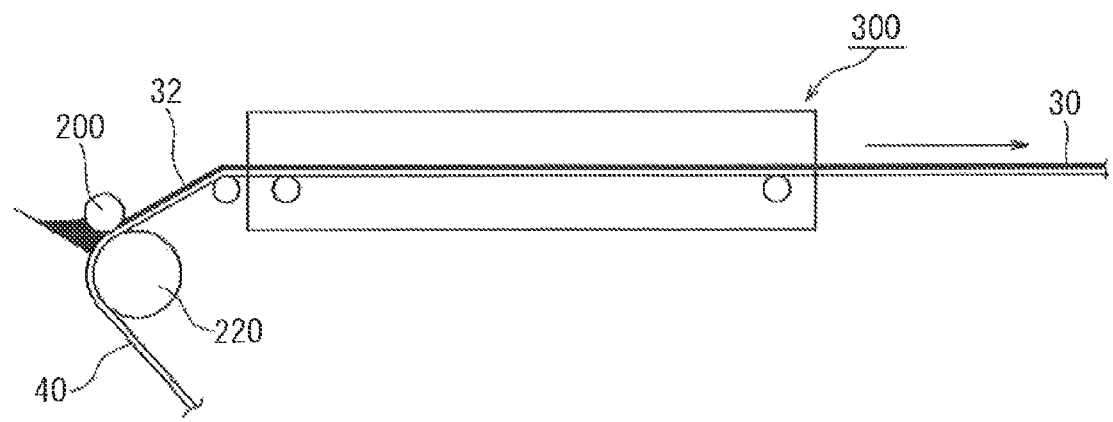
FIG. 3 is a diagram schematically showing a production process of a lithium secondary battery according to an embodiment of the present invention.

As means for coating the separator with the slurry, various methods used in any of conventionally known coating processes can be adopted. For example, a gravure coater, a slit coater, a die coater, a comma coater, a dip coater, and the like can be favorably adopted. As a method of coating the separator with the slurry according to the technique disclosed herein, for example, a gravure coater using a gravure roll can be favorably adopted. For example, as schematically shown in FIG. 3, the separator 40 may be conveyed by a rotation of a back-up roll 220 to be passed through a gap between the back-up roll 220 and a gravure roll 200, whereby the slurry 32 may be applied from the gravure roll 200 along a longitudinal direction of the traveling separator 40.

In doing so, a coating thickness of the slurry coating material may be adjusted so that a thickness of a formed porous layer ranges from 3 to 15 μm, favorably ranges from 4 to 11 μm, more favorably ranges from 6 to 10 μm, and particularly favorably ranges from 7 to 8 μm. The coating thickness of the slurry coating material can be arbitrarily adjusted by controlling a rotating speed of the gravure roll 200 and a traveling speed of the separator 40.

Next, in step (B), the solvent (for example, water or another water-based solvent) in the slurry coating material is removed by drying the coating material with drying air. By removing the solvent from the coating material, a porous layer-attached separator on which a porous layer is formed on the separator is obtained.

In this case, the separator according to the present embodiment has a porosity ranging from 52 to 67% which is relatively higher than the porosity of conventional separators. When forming a porous layer on such a highly porous separator, if drying of the slurry coating material takes too much time, the inorganic filler penetrates into the holes of the separator and causes a decline in the porosity of the separator. Such a decline in porosity causes an increase in a film resistance of the separator and is therefore unfavorable. In the present embodiment, the slurry coating material is efficiently dried in order to prevent the inorganic filler from penetrating into the separator holes. As a preferable condition for drying the slurry coating material in an efficient manner, for example, a solid content of the slurry (a proportion of solids in the entire slurry) is appropriately selected.

More specifically, according to the production method disclosed herein, a slurry with a solid content which ranges from 38 to 58% by mass is used as the applied slurry. Since such a slurry coating material has a smaller amount of solvent (for example, a smaller amount of water) than a conventional slurry coating material, drying is efficiency improved. Therefore, by using a slurry with a solid content within such a predetermined range, the slurry coating material can be efficiently dried and the inorganic filler can be appropriately prevented from penetrating into the holes of the separator.

Moreover, if the solid content of the slurry is excessively high, handleability (such as coatability when coating (for example, by gravure coating) the separator with the slurry) when forming a porous layer on the separator using the slurry may become impaired. In order to balance drying efficiency with handleability, the solid content of the slurry suitably ranges from 38 to 58% by mass, favorably ranges from 40 to 55% by mass, more favorably ranges from 42 to 52% by mass, and particularly favorably ranges from 42 to 50% by mass.

In addition, drying conditions applied when drying the slurry coating material are also an important factor from the perspective of efficiently drying the slurry coating material. Drying of the slurry coating material can be performed by coating one surface of the separator with the slurry coating material and subsequently blowing hot air from both sides (both surfaces 42 and 44 (FIG. 2)) of the separator. With the technique disclosed herein, as shown in FIG. 3, after coating the separator with the slurry 32 using the gravure coater 200, the separator is continuously conveyed into a hot-air drier 300. The hot-air drier 300 has a built-in heater and a blast fan (both not shown) and, by controlling an ambient temperature (drying temperature) inside the drier and an air speed (drying air speed), dries the slurry coating material and forms the porous layer 30 on the separator 40.

Normally, the ambient temperature (maximum drying temperature) is favorably set to 40° C. or higher at which high drying performance is produced and suitably ranges from to 80° C., more favorably ranges from 50 to 80° C., even more favorably ranges from 55 to 80° C., and particularly favorably ranges from 60 to 80° C. On the other hand, when the drying temperature exceeds 80° C., the separator may become damaged due to heat and is therefore unfavorable.

Furthermore, normally, the drying air speed is favorably set to 13 m/s or higher at which high drying performance is produced and suitably ranges from 13 to 27 m/s, more favorably ranges from 15 to 27 m/s, even more favorably ranges from 18 to 27 m/s, and particularly favorably ranges from 20 to 25 m/s. On the other hand, when the drying air speed exceeds 27 m/s, the separator may become damaged due to wind pressure and is therefore unfavorable.

Preferable examples of drying conditions disclosed herein include a drying temperature ranging from 40 to 80° C. and a drying air speed ranging from 13 to 27 m/s, a drying temperature ranging from 50 to 80° C. and a drying air speed ranging from 15 to 27 m/s, and a drying temperature ranging from 60 to 70° C. and a drying air speed ranging from 20 to 25 m/s. By drying under such drying conditions (ambient temperature and air speed) within predetermined ranges, the slurry coating material can be efficiently dried and the inorganic filler can be appropriately prevented from penetrating into the holes of the separator.

Moreover, according to the production method disclosed herein, as a preferred condition for efficiently drying the slurry coating material, the porous layer is formed at a thickness ranging from 3 to 15 μm. Under this condition, since a coating thickness of the slurry coating material is small, the slurry coating material can be efficiently dried. Therefore, by setting the solid content from 38 to 58% by mass and, at the same time, appropriately selecting drying conditions, the slurry coating material can be dried in an efficient manner.

Furthermore, according to the production method disclosed herein, as a preferred condition for efficiently drying the slurry coating material, a separator with an average thickness ranging from 12 to 18 μm and a porosity ranging from 52% to 67% is used. Since such a thin and highly porous separator has superior air permeability and liquid permeability, by blowing drying air to both surfaces of the separator, the slurry coating material applied to the separator can be dried in an efficient manner. Therefore, by setting the solid content from 38 to 58% by mass and, at the same time, appropriately selecting drying conditions, the slurry coating material can be dried in an efficient manner.

Moreover, the proportion of the binder in the slurry favorably ranges from 1.1 to 3.6% by mass when 100% by mass represents a total solid content of the slurry. When the proportion of the binder is excessively low, drying of the porous layer may take time and the inorganic filler may penetrate into the holes of the separator, and when the proportion of the binder is excessively high, handleability (such as coatability when coating (for example, by gravure coating) the separator with the slurry) when forming a porous layer on the separator using the slurry may become impaired. In order to balance drying efficiency with handleability, the proportion of the binder normally ranges from 1.1 to 3.6% by mass, favorably ranges from 1.5 to 3.6% by mass, more favorably ranges from 1.5 to 3.0% by mass, and particularly favorably ranges from 1.8 to 2.5% by mass.

With the method according to the present embodiment, by setting the thickness of the separator to 12 to 18 μm, the porosity of the separator to 52 to 67%, the thickness of the porous layer to 3 to 15 μm, the solid content of the slurry to 38 to 58% by mass, the drying temperature to 40 to 80° C., and the drying air speed to 13 to 27 m/s, the slurry coating material can be dried in an efficient manner. Therefore, even when a porous layer is formed on the separator, the inorganic filler in the porous layer can be appropriately prevented from penetrating into holes of the separator and a high porosity of the separator can be maintained. By using such a porous layer-attached separator, an optimal lithium secondary battery with high endurance with respect to high-rate charge and discharge can be constructed.

Next, in step (C), a nonaqueous electrolyte lithium secondary battery is constructed using the porous layer-attached separator described above. With the exception of using the porous layer-attached separator disclosed herein, the lithium secondary battery can be constructed by adopting materials and processes similar to those that are conventional.

Figure 4:
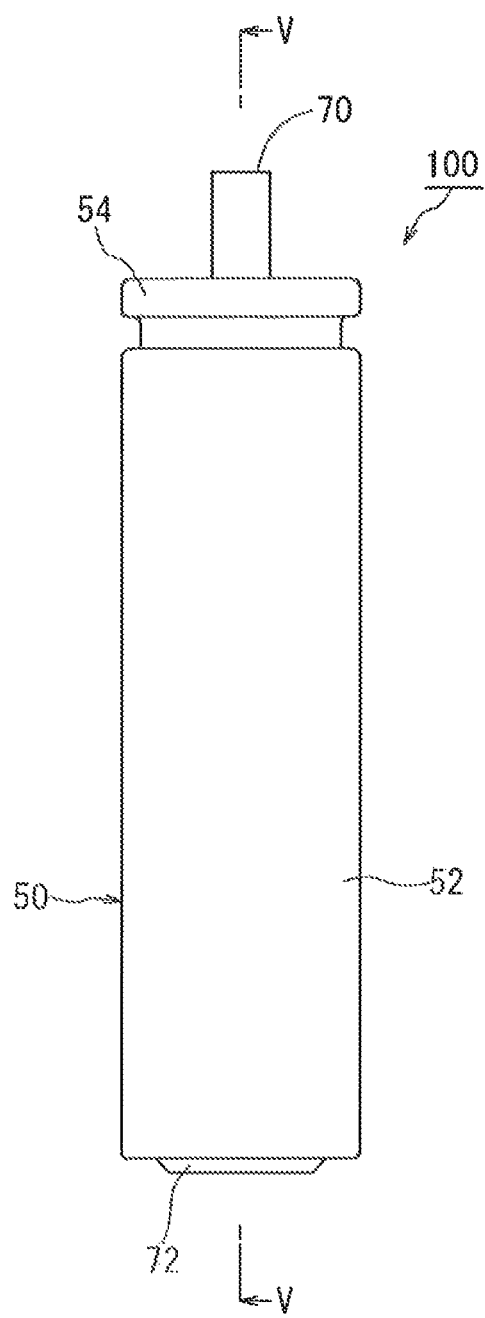
FIG. 4 is a side view schematically showing a lithium secondary battery according to an embodiment of the present invention.
Figure 5:
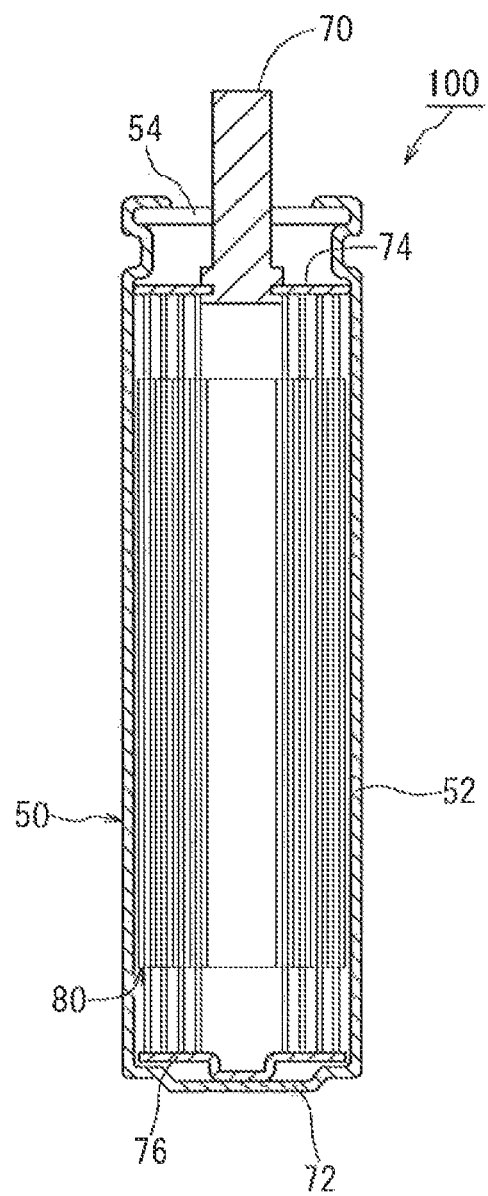
FIG. 5 is a sectional view taken along line V-V in FIG. 1.
Figure 6:
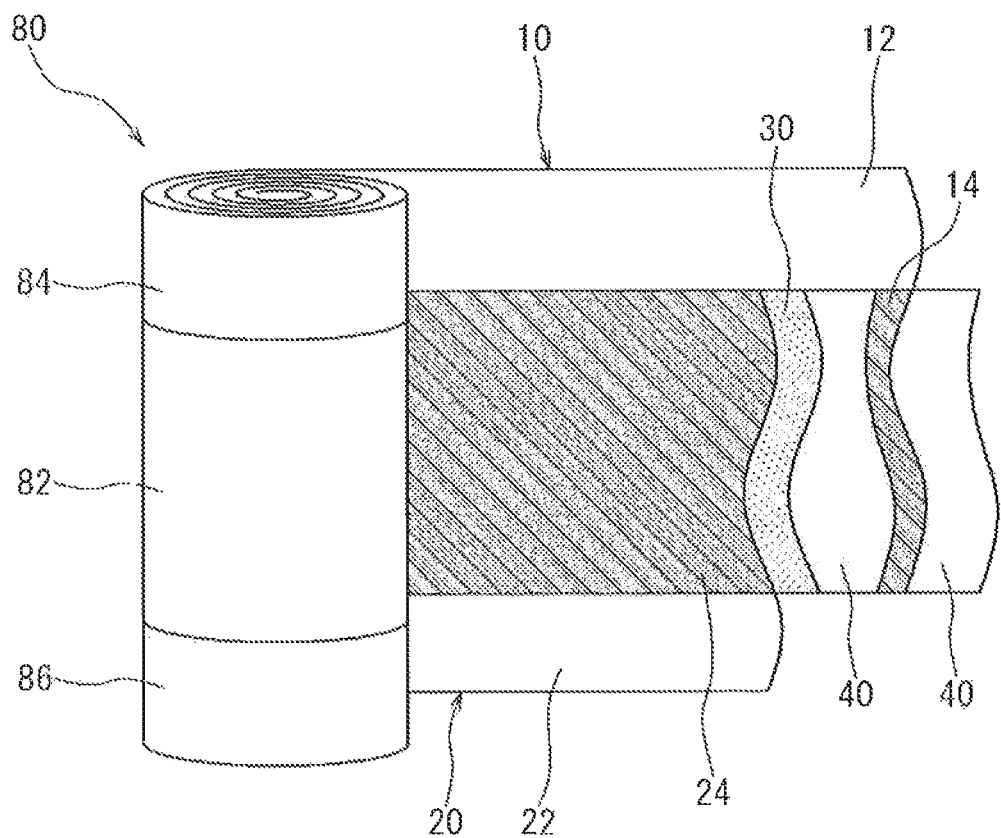
FIG. 6 is a schematic view for describing a wound electrode body according to an embodiment of the present invention.

For example, as shown in FIGS. 4 to 6, a lithium secondary battery 100 has a structure in which an electrode body (wound electrode body) 80, configured such that an elongated positive electrode sheet 10 and an elongated negative electrode sheet 20 are flatly wound via an elongated separator 40, is housed together with a nonaqueous electrolyte solution (not shown) in a container 50 with a shape (a cylindrical shape) capable of housing the wound electrode body 80.

The container 50 comprises a bottomed cylindrical container main body 52 having an open upper end, and a lid body 54 that blocks the opening thereof. As a material that constitutes the container 50, a metallic material such as aluminum, steel, and Ni-plated SUS is favorably used (Ni-plated SUS is used in the present embodiment). Alternatively, the container 50 may be molded from a resin material such as PPS or polyimide resin. A positive electrode terminal 70 that is electrically connected to the positive electrode 10 of the wound electrode body 80 is provided on an upper surface of the container 50 (in other words, on the lid body 54). A negative electrode terminal 72 (in the present embodiment, the container main body 52 doubles as the negative electrode terminal 72) that is electrically connected to the negative electrode 20 of the electrode body 80 is provided on a lower surface of the container 50. The wound electrode body 80 is housed together with a nonaqueous electrolyte solution (not shown) inside the container 50.

The wound electrode body 80 according to the present embodiment is similar to a wound electrode body of an ordinary lithium secondary battery with the exception of a configuration of a porous layer-attached separator and, as shown in FIG. 6, has an elongated (band-shaped) sheet structure prior to assembly of the wound electrode body 80.

The positive electrode sheet 10 has a structure in which an positive electrode active material layer 14 containing a positive electrode active material is retained on both surfaces of an elongated sheet-shaped foil-like positive electrode current collector 12. However, the positive electrode active material layer 14 is not attached to one side edge (a lower side edge portion in the drawing) along an end side of the positive electrode sheet 10 in a width direction, and an positive electrode active material layer unformed section is formed in which the positive electrode current collector 12 is exposed at a constant width.

In a similar manner to the positive electrode sheet 10, the negative electrode sheet 20 also has a structure in which a negative electrode active material layer 24 containing a negative electrode active material is retained on both surfaces of an elongated sheet-shaped foil-like negative electrode current collector 22. However, the negative electrode active material layer 24 is not attached to one side edge (an upper side edge portion in the drawing) along an end side of the negative electrode sheet 20 in a width direction, and a negative electrode active material layer unformed section is formed in which the negative electrode current collector 22 is exposed at a constant width.

When fabricating the wound electrode body 80, as shown in FIG. 6, the positive electrode sheet 10 and the negative electrode sheet 20 are laminated via the porous layer-attached separator 40. In doing so, the negative electrode sheet 20 is arranged so that a porous layer 30 provided on the separator 40 opposes the negative electrode sheet 20. In addition, the positive electrode sheet 10 and the negative electrode sheet 20 are overlapped slightly displaced in a width direction so that the positive electrode active material layer unformed section of the positive electrode sheet 10 and the negative electrode active material layer unformed section of the negative electrode sheet 20 respectively protrude from both sides of the separator 40 in the width direction. The wound electrode body 80 can be fabricated by winding a laminated body that is overlapped in this manner.

A wound core portion 82 (that is, a portion in which the positive electrode active material layer 14 of the positive electrode sheet 10, the negative electrode active material layer 24 of the negative electrode sheet 20, and the separator sheet 40 are tightly laminated) is formed in a central portion of the wound electrode body 80 in a winding axis direction. In addition, the electrode active material layer unformed sections of the positive electrode sheet 10 and the negative electrode sheet 20 respectively protrude outward from the wound core portion 82 at both ends of the wound electrode body 80 in the winding axis direction. A positive electrode lead terminal 74 and an negative electrode lead terminal 76 are respectively annexed to the positive electrode-side protruding portion (in other words, the unformed portion of the positive electrode active material layer 14) 84 and the negative electrode-side protruding portion (in other words, the unformed portion of the negative electrode active material layer 24) 86, and are respectively electrically connected to the positive electrode terminal 70 and the negative electrode terminal 72 (in this case, the container main body 52 doubles as the negative electrode terminal 72) described above.

Components constituting the wound electrode body 80 may be similar to those of a wound electrode body of a conventional lithium secondary battery with the exception of the porous layer-attached separator 40, and are not particularly limited. For example, the positive electrode sheet 10 can be formed by attaching a positive electrode active material layer 14 composed mainly of lithium-ion battery positive electrode active materials on top of an elongated positive electrode current collector 12. An aluminum foil or other metallic foils suitable for a positive electrode is preferably used as the positive electrode current collector 12. As the positive electrode active material, one or two or more types of materials conventionally used in lithium-ion batteries can be used without any particular limitation. Favorable application objects of the technique disclosed herein include positive electrode active materials composed mainly of an oxide that includes lithium and a transition metal element as constituent metal elements (a lithium-containing transition metal oxide) such as lithium-nickel oxide ($LiMn_2O_4$), lithium-cobalt oxide ($LiCoO_2$), and lithium-manganese oxide ($LiNiO_2$).

The negative electrode sheet 20 can be formed by attaching the negative electrode active material layer 24 composed mainly of lithium-ion battery negative electrode active materials on top of the elongated negative electrode current collector 22. A copper foil or other metallic foils suitable for a negative electrode is preferably used as the negative electrode current collector 22. As the negative electrode active material, one or two or more types of materials conventionally used in a lithium-ion battery can be used without any particular limitation. Preferable examples include carbon-based materials such as carbon graphite and amorphous carbon, lithium-containing transition metal oxide, transition metal nitride, and the like.

The wound electrode body 80 configured as described above is housed in the container main body 52, and an appropriate nonaqueous electrolyte solution is arranged inside (introduced into) the container main body 52.

As the nonaqueous electrolyte solution that is housed together with the wound electrode body 80 in the container main body 52, nonaqueous electrolyte solutions similar to those used in a conventional lithium-ion battery can be used without any particular limitation. This non-aqueous electrolyte solution typically has a composition in which a supporting electrolyte is contained in a suitable non-aqueous solvent. As the nonaqueous solvent described above, for example, ethylene carbonate (EC), ethyl methyl carbonate (EMC), dimethyl carbonate (DMC), diethyl carbonate (DEC), or propylene carbonate (PC) can be used. In addition, as the supporting electrolyte described above, for example, a lithium salt such as $LiPF_6$, $LiBF_4$, $LiAsF_6$, $LiCF_3SO_3$, or $LiClO_4$ can be used. For example, a nonaqueous electrolyte solution in which $LiPF_6$ as a supporting electrolyte is contained at a concentration of approximately 1 mol/liter in a mixed solvent containing EC, EMC, and DMC at a volume ratio of 3:4:3 can be favorably used.

By housing the nonaqueous electrolyte solution together with the wound electrode body 80 in the container main body 52 and sealing the opening of the container main body 52 with the lid body 54, the construction (assembly) of the lithium-ion battery 100 according to the present embodiment is completed. Moreover, the sealing process of the container main body 52 and the arrangement (introduction) process of the electrolyte solution can be performed in a similar manner to methods used when manufacturing a conventional lithium-ion battery. Subsequently, conditioning (initial charging and discharging) of the battery is performed. Processes such as degassing and quality inspections may be performed as necessary.

While several test examples relating to the present invention will be described below, it is to be understood that the present invention is not intended to be limited by the contents indicated in the following test examples.

EXAMPLE 1

[Porous Layer-Attached Separator]

α alumina powder as an inorganic filler, an acrylic binder water-based solution (solid content 45% by mass), and carboxymethyl cellulose (CMC) powder as a thickener were prepared and mixed so as to obtain a mass ratio of the inorganic filler, the binder, and the thickener of 98.2:1.1:0.7 and a solid content of approximately 38% by mass. A slurry was prepared using a high-speed agitation/dispersion machine (CLEARMIX, manufactured by M Technique Co., Ltd.) by subjecting the mixture to preliminary kneading at 15000 rpm for 5 minutes and subsequently to main kneading at 20000 rpm for 15 minutes. A porous layer-attached separator was fabricated by coating one surface of an elongated separator (a separator with a three-layer structure of polypropylene (PP)/polyethylene (PE)/polypropylene (PP), a porosity of 52% and an average thickness of 12 μm was used) with the slurry using a gravure roll and then drying the slurry. Coating conditions were adjusted so as to set: a traveling speed A of the separator to 3 m/min, a rotating speed B of the gravure roll to 3.8 m/min, a ratio (speed ratio=A/B) of the rotating speed B of the gravure roll to the traveling speed A of the separator to 1.27, and a coating amount of the slurry to approximately 0.55 mg/cm$^2$ (based on solid content). In addition, drying was performed by blowing drying air against the separator from both sides of the separator at a drying temperature of 70° C. and a drying air speed of 13 m/s. The obtained porous layer had an average thickness of 3 μm and a porosity of 44%.

Moreover, the porosity of the separator was calculated by $(1-W/\rho V) \times 100$, where W denotes a mass of the separator, V denotes an apparent volume of the separator, and ρ denotes a true density of the separator (a value obtained by dividing the mass W by an actual volume which does not contain holes). The porosity was also confirmed using a mercury porosimeter. For the average thickness of the separator, thicknesses were measured using a micrometer at 30 points on a 5 cm by 7 cm piece of the separator and an average value of the thicknesses was used. The average thickness was also confirmed by a sectional SEM photograph of the separator. The porosity of the porous layer was calculated by $(1-W/\rho V) \times 100$, where W denotes a mass of the porous layer, V denotes an apparent volume of the porous layer, and ρ denotes a true density (a theoretical density) of materials constituting the porous layer. For the average thickness of the porous layer, first, thicknesses were measured using a micrometer at 30 points on a 5 cm by 7 cm piece of the porous layer-attached separator, and an average value of the thicknesses was calculated as a thickness of the porous layer-attached separator. Next, the porous layer-attached separator was wetted by ethanol to remove the porous layer, a thickness of the separator from which the porous layer had been removed was measured and obtained by the same method, and a value obtained by subtracting an average thickness of the separator from an average thickness of the porous layer-attached separator was adopted as the thickness of the porous layer. The thickness of the porous layer was also confirmed by a sectional SEM photograph of the porous layer-attached separator.

EXAMPLES 2 to 18 and COMPARATIVE EXAMPLES 1 to 9

Porous layer-attached separators were fabricated in a similar manner to Example 1 with the exception of the porosity of the separator, the thickness of the separator, the type of the separator, the porosity of the porous layer, the thickness of the porous layer, the solid content of the slurry, the proportion of the binder in the slurry, drying temperature, and drying air speed being modified as shown in Table 1. Table 1 describes conditions that differ from those of Example 1.

TABLE 1

| | Separator | | | Porous layer | | | Slurry | | Drying conditions | | | Evaluation tests | | |
|---|---|---|---|---|---|---|---|---|---|---|---|---|---|---|
| | Porosity/ % | Thickness/ μm | Type | Porosity/ % | Thickness/ μm | Filler type | Solid content/ % by mass | Binder proportion/ % by mass | Drying temp./ ° C. | Drying air speed/ m·s$^{-1}$ | Residual moisture/ % | Film resistance/ Ω·cm$^2$ | Resistance increase rate/% | Safety |
| Example 1 | 52 | 12 | PP/PE/PP | 44 | 3 | α alumina | 38 | 1.1 | 70 | 13 | 0.191 | 1.35 | 7 | ○ |
| Example 2 | 52 | 12 | PP/PE/PP | 45 | 4 | α alumina | 39 | 1.2 | 70 | 13 | 0.185 | 1.3 | 5 | ○ |
| Example 3 | 53 | 12 | PP/PE/PP | 45 | 6 | α alumina | 40 | 1.3 | 40 | 16.2 | 0.173 | 1.23 | 4.2 | ○ |
| Example 4 | 57 | 12 | PE | 47 | 7 | α alumina | 42 | 1.5 | 50 | 16.2 | 0.17 | 1.2 | 4 | ○ |
| Example 5 | 60 | 14 | PE | 49 | 7.5 | α alumina | 45 | 1.8 | 55 | 18.9 | 0.155 | 1.15 | 3.8 | ○ |
| Example 6 | 62 | 14 | PE | 52 | 8 | α alumina | 47 | 2 | 55 | 18.9 | 0.129 | 1.1 | 3.5 | ○ |
| Example 7 | 62 | 15 | PE | 56 | 8 | boehmite | 50 | 2.1 | 55 | 18.9 | 0.108 | 1.04 | 3.2 | ○ |
| Example 8 | 63 | 15 | PE | 58 | 8.5 | α alumina | 51 | 2.3 | 60 | 21.6 | 0.077 | 1 | 3 | ○ |
| Example 9 | 63 | 16 | PE | 60 | 9 | α alumina | 52 | 2.5 | 60 | 21.6 | 0.055 | 0.95 | 2 | ○ |
| Example 10 | 65 | 16 | PE | 62 | 9.5 | boehmite | 52 | 2.7 | 65 | 21.6 | 0.039 | 0.9 | 3 | ○ |
| Example 11 | 66 | 17 | PE | 65 | 10 | boehmite | 53 | 2.9 | 65 | 24.3 | 0.028 | 0.85 | 5 | ○ |
| Example 12 | 67 | 17 | PE | 68 | 10.5 | magnesium hydroxide | 55 | 3 | 70 | 24.3 | 0.02 | 0.8 | 8 | ○ |
| Example 13 | 67 | 18 | PE | 70 | 11 | magnesium carbonate | 58 | 3.5 | 70 | 26.9 | 0.018 | 0.8 | 10 | ○ |
| Example 14 | 67 | 18 | PP/PE/PP | 69 | 15 | titania | 58 | 3.6 | 80 | 26.9 | 0.015 | 0.77 | 12 | ○ |
| Example 15 | 63 | 16 | PE | 61 | 8.8 | α alumina | 52 | 2.5 | 60 | 21 | 0.04 | 0.94 | 1.9 | ○ |
| Example 16 | 63 | 16 | PE | 61 | 8.8 | boehmite | 52 | 2.5 | 60 | 21.6 | 0.045 | 0.95 | 1.9 | ○ |
| Example 17 | 63 | 16 | PE | 61 | 8.8 | magnesium carbonate | 52 | 2.5 | 60 | 21.6 | 0.058 | 0.98 | 2.5 | ○ |
| Example 18 | 63 | 16 | PE | 61 | 8.8 | magnesium hydroxide | 52 | 2.5 | 60 | 21.6 | 0.062 | 0.99 | 2.6 | ○ |
| Comparative Example 1 | 47 | 18 | PP/PE/PP | 50 | 6.5 | titania | 47.5 | 1.9 | 55 | 15.6 | 0.35 | 2.1 | 210 | ○ |
| Comparative Example 2 | 55 | 20 | PE | 50.5 | 6.9 | titania | 47.5 | 2 | 55 | 15.6 | 0.39 | 2.2 | 170 | ○ |

TABLE 1-continued

| | Separator | | | Porous layer | | | Slurry | | Drying conditions | | | Evaluation tests | | |
|---|---|---|---|---|---|---|---|---|---|---|---|---|---|---|
| | Porosity/% | Thickness/μm | Type | Porosity/% | Thickness/μm | Filler type | Solid content/% by mass | Binder proportion/% by mass | Drying temp./°C | Drying air speed/m·s⁻¹ | Residual moisture/% | Film resistance/Ω·cm² | Resistance increase rate/% | Safety |
| Comparative Example 3 | 47 | 20 | PP/PE/PP | 51 | 6.8 | titania | 47.5 | 2.1 | 55 | 15.6 | 0.42 | 2.8 | 250 | ○ |
| Comparative Example 4 | 56 | 18 | PP/PE/PP | 52 | 2.5 | α alumina | 33 | 3 | 50 | 13.5 | 0.32 | 2.2 | 80 | x |
| Comparative Example 5 | 56 | 18 | PP/PE/PP | 51 | 16 | α alumina | 60 | 4 | 50 | 13.5 | 0.345 | 2.2 | 180 | ○ |
| Comparative Example 6 | 56 | 17 | PE | 43 | 7 | titania | 48 | 2 | 35 | 8.1 | 0.39 | 2.5 | 230 | ○ |
| Comparative Example 7 | 56 | 17 | PE | 72 | 7.2 | titania | 48.5 | 1.2 | 73 | 28 | 0.29 | 1.6 | 15 | x |
| Comparative Example 8 | 56 | 18 | PP/PE/PP | 41 | 17 | α alumina | 60 | 4.2 | 50 | 13 | 0.37 | 2.3 | 170 | ○ |
| Comparative Example 9 | 45 | 20 | PP/PE/PP | 42 | 2.5 | α alumina | 32 | 2.9 | 40 | 8.1 | 0.45 | 3 | 350 | x |

[Measurement of Residual Moisture]

A quantity of residual moisture contained in the various obtained porous layer-attached separators was measured by Karl Fischer's method (water measuring device). Results thereof are shown in Table 1.

As is apparent from Table 1, the porous layer-attached separators according to Comparative examples 1 to 9 had residual moisture of 0.29% or more and exhibited unfavorable drying conditions.

In contrast, the porous layer-attached separators according to Examples 1 to 18 in which the thickness of the separator was set to 12 to 18 μm, the porosity of the separator was set to 52 to 67%, the thickness of the porous layer was set to 3 to 15 μm, the solid content of the slurry was set to 38 to 58% by mass, the drying temperature was set to 40 to 80° C., and the drying air speed was set to 13 to 27 m/s had residual moisture of 0.191% or less and exhibited favorable drying conditions. In other words, it was confirmed that the porous layer can be efficiently dried by satisfying all of the conditions described above.

[Measurement of Film Resistance]

Figure 7:
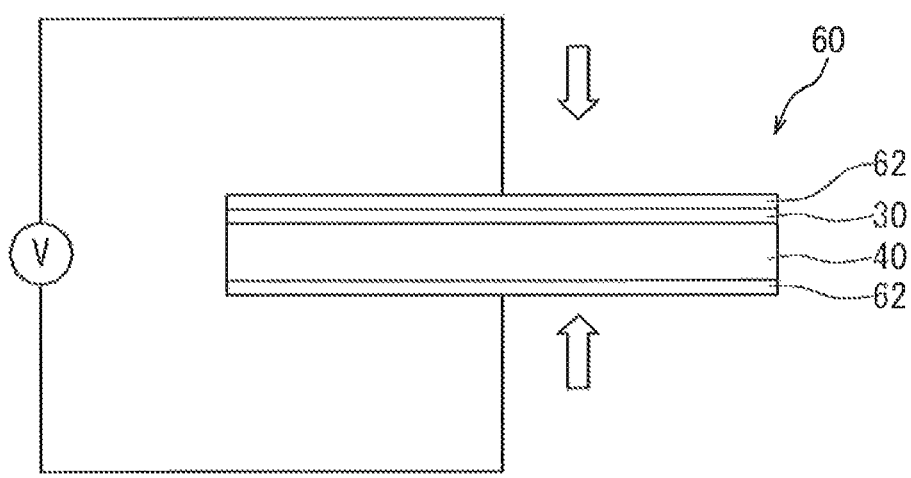
FIG. 7 is a diagram for describing a film resistance measurement method according to a text example.
Figure 8:
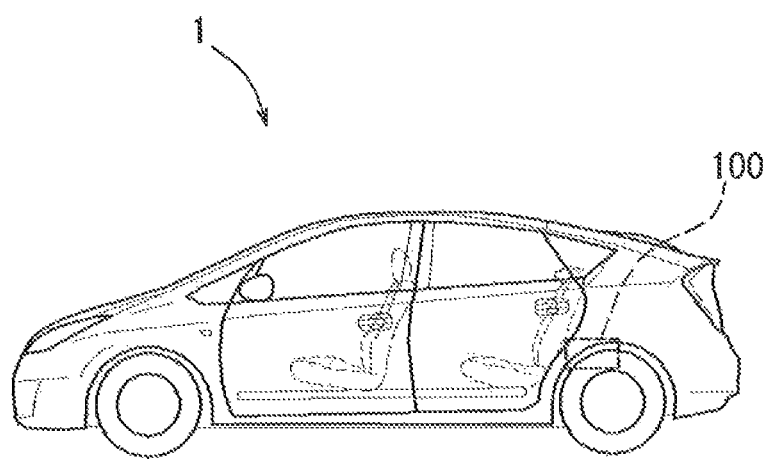
FIG. 8 is a side view schematically showing a vehicle comprising a lithium secondary battery according to an embodiment of the present invention.

Measurement cells were fabricated using the various obtained porous layer-attached separators and a film resistance (Rs) thereof was evaluated. Specifically, as shown in FIG. 7, the porous layer 30-attached separator 40 was impregnated with a nonaqueous electrolyte solution and sandwiched between two 1 mm-thick copper plates 62 with a surface area of 35 mm² to fabricate a measurement cell 60. As the nonaqueous electrolyte solution, a nonaqueous electrolyte solution prepared by incorporating LiPF$_6$ as a supporting electrolyte at a concentration of approximately 1 mol/liter into a mixed solvent containing ethylene carbonate (EC), dimethyl carbonate (DMC), and ethyl methyl carbonate (EMC) at a volume ratio of 3:4:3 was used. Such cells 60 were fabricated so as to respectively contain one, two, and three sheets of the porous layer-attached separator. In addition, each cell was placed in a 25° C. thermostatic chamber, and a resistance value (Rs) of the cell was measured by an alternating current impedance method while applying a torque pressure of 50 cN·m from above and below the two copper plates 62. As alternating current impedance measurement conditions, an alternating current applied voltage was set to 5 mV and a frequency range was set to 10000 Hz to 1 Hz. The obtained resistance values of the respective cells were plotted relative to the number of sheets of the porous layer-attached separator, and a straight-line approximation was performed to obtain a film resistance per one sheet of the porous layer-attached separator. Results thereof are shown in Table 1.

As is apparent from Table 1, the porous layer-attached separators according to Examples 1 to 18 exhibited a significant decrease in film resistance as compared to the porous layer-attached separators according to Comparative examples 1 to 9. With the porous layer-attached separators under test, the film resistance decreased as the porosity of the separators increased. In particular, by setting the porosity of the separator to 52% or more, low film resistance of 1.35 Ω·cm² or less was achieved.

On the other hand, with the porous layer-attached separators according to Comparative examples 2 and 4 to 8, film resistance exceeded 1.6 Ω·cm² even though the porosity of the separators was equal to or higher than 52%. This phenomenon is conceivably attributable to insufficient drying of the porous layer-attached separators according to Comparative examples 2 and 4 to 8 which allowed the inorganic filler to penetrate into the holes of the separators and caused a decline in the porosity of the separators.

[Evaluation of Battery Characteristics]

Lithium secondary batteries were constructed using the various obtained porous layer-attached separators and battery characteristics thereof were evaluated. The lithium secondary batteries were fabricated as follows.

[Positive Electrode Sheet]

A positive electrode active material layer paste was prepared by mixing $Li_{1.15}Ni_{0.33}Mn_{0.33}Co_{0.33}O_2$ powder as a positive electrode active material, acetylene black (AB) as a conductive material, and polyvinylidene fluoride (PVdF) as a binder in N-methylpyrrolidone (NMP) so that the materials assumed a mass ratio of 88:10:2. The positive electrode active material layer paste was applied in a band-shape to both surfaces of an elongated sheet-shaped aluminum foil (the positive electrode current collector 12) and subsequently dried to fabricate the positive electrode sheet 10 in which the positive electrode active material layer 14 is provided on both surfaces of the positive electrode current collector 12. The coated amounts of the positive electrode active material layer paste were adjusted so as to have a combined total of approximately 17.2 mg/cm² (based on solid content) for both surfaces.

[Negative Electrode Sheet]

A negative electrode active material layer paste was prepared by dispersing graphite powder as a negative electrode active material, styrene butadiene rubber (SBR) as a binder, and carboxymethyl cellulose (CMC) as a thickener into water so that the materials assumed a mass ratio of 98.6:0.7:0.7. The negative electrode active material layer paste was applied to both surfaces of an elongated sheet-shaped copper foil (the negative electrode current collector 22) to fabricate the negative electrode sheet 20 in which the negative electrode active material layer 24 is provided on both surfaces of the negative electrode current collector 22. The coated amounts of the negative electrode active material layer paste were adjusted so as to have a combined total of approximately 11.1 mg/cm$^2$ (based on solid content) for both surfaces.

[Lithium Secondary Battery]

A wound electrode body 80 was fabricated by winding the positive electrode sheet 10 and the negative electrode sheet 20 via two separator sheets 40. In doing so, the negative electrode sheet 20 was arranged so as to oppose the porous layer 30 on the separator sheet surface. The wound electrode body 80 obtained in this manner was housed in a battery container 50 (in this case, a 18650-type cylindrical container was used) with a nonaqueous electrolyte solution, and an opening of the battery container 50 was hermetically sealed. As the nonaqueous electrolyte solution, a nonaqueous electrolyte solution prepared by incorporating LiPF$_6$ as a supporting electrolyte at a concentration of approximately 1 mol/liter into a mixed solvent containing ethylene carbonate (EC), ethyl methyl carbonate (EMC), and dimethyl carbonate (DMC) at a volume ratio of 3:4:3 was used. The lithium secondary battery 100 was assembled in this manner.

[High-Rate Endurance Test]

The obtained lithium secondary battery was subjected to a charge-discharge pattern in which a 10-second CC discharge at 20 C is repetitively performed to perform a charge-discharge cycle test. Specifically, in a room temperature environment (approximately 25° C.), a charge-discharge cycle involving performing a CC discharge at 20 C for 10 seconds, resting for 5 seconds, and performing a CC charge at 5 C for 40 seconds was continuously repeated 10000 times. Subsequently, a resistance increase rate was calculated based on an IV resistance (an initial resistance of the lithium secondary battery) prior to the charge-discharge cycle test and an IV resistance after the charge-discharge cycle test. In this case, IV resistances before and after the charge-discharge cycle were respectively calculated based on a voltage drop 10 seconds after a 30 C pulse discharge performed at 25°C. Moreover, the resistance increase rate (%) was obtained by [(IV resistance after charge-discharge cycle test−IV resistance before charge-discharge cycle test)/IV resistance before charge-discharge cycle test]×100. Results thereof are shown in Table 1.

As shown in Table 1, the batteries according to Examples 1 to 18 in which the thickness of the separator was set to 12 to 18 μm, the porosity of the separator was set to 52 to 67%, the thickness of the porous layer was set to 3 to 15 μm, the porosity of the porous layer was set to 44 to 70%, and the film resistance of the porous layer-attached separator was set to 1.35 Ω·cm$^2$ or lower had a resistance increase rate after the cycle tests of 12% or lower and were favorable. With the batteries under test, by setting the porosity of the separator to 60 to 67%, the thickness of the separator to 14 to 17 μm, the porosity of the porous layer to 49 to 68%, and the thickness of the porous layer to 3 to 10.5 μm, an extremely low resistance increase rate of 8% or lower was achieved. In addition, a comparison of Examples 15 to 18 confirmed that the resistance increase rate can be further improved by using a alumina or boehmite as the inorganic filler.

[Foreign Object-induced Internal Short Circuit Test]

Lithium secondary batteries were fabricated by the same method as the steps described above and a foreign object-induced internal short circuit test was performed. The foreign object-induced internal short circuit test was performed in compliance with JIS C 8714 using a 1 mm by 1 mm L-shaped nickel piece with a height of 0.2 mm and a width of 0.1 mm, and the presence or absence of defective pieces which reached abnormal smoke generation was studied. Results thereof are shown in Table 1. In Table 1, batteries where smoke generation was not observed are denoted by ○ while those where smoke generation was observed are denoted by x.

As shown in Table 1, with the batteries according to Comparative examples 4 and 9 in which the thickness of the porous layer was less than 3 μm, the effect of the porous layer of preventing an electrical contact between the positive electrode and the negative electrode was insufficient and smoke generation was observed during the short circuit test. In addition, with the battery according to Comparative example 7 in which the porosity of the porous layer was higher than 70%, the effect of the porous layer of preventing an electrical contact between the positive electrode and the negative electrode was similarly insufficient and smoke generation was observed during the short circuit test. On the other hand, with the batteries according to Examples 1 to 18 in which the thickness of the porous layer was set from 3 to 15 μm and the porosity of the porous layer was set from 44 to 70%, smoke generation was not observed even during the foreign object-induced internal short circuit test and the batteries were confirmed to be superior in safety.

From the results described above, according to the present tests, by setting the porosity of the separator to 52 to 67%, the thickness of the separator to 12 to 18 μm, the porosity of the porous layer to 44 to 70%, the thickness of the porous layer to 3 to 15 μm, and the film resistance of the porous layer-attached separator to 1.35 Ω·cm$^2$ or lower, lithium secondary batteries with a low resistance increase rate after high-rate charge-discharge cycles and with superior safety were realized. Consequently, according to the present configuration, a high-performance lithium secondary battery with superior high-rate charge-discharge cycle endurance and superior safety can be achieved.

While the present invention has been described in its preferred embodiment and examples, it is to be understood that the present invention is not limited to such description and that various modifications can obviously be made.

For example, while a case where the porous layer 30 is formed on a surface which opposes the negative electrode sheet 20 of the separator sheet 40 is shown in the embodiment and the examples described above, this configuration is not restrictive. The porous layer 30 may alternatively be formed on a surface opposing the positive electrode sheet of the separator sheet or may be formed on both surfaces of the separator sheet.

In addition, a lithium secondary battery to be constructed is not limited to any particular shape (outer shape and size) as long as the favorable porous layer-attached separator disclosed herein is adopted. The lithium secondary battery may be any of a thin sheet-type lithium secondary battery with an outer package constituted by a laminated film or the like, a battery with a cylindrical or cuboid outer case, and a small button-shaped lithium secondary battery.

Moreover, any lithium secondary battery (in other words, a nonaqueous electrolyte lithium secondary battery characterized by the use of a porous layer-attached separator) 100 disclosed herein provides performance suitable as a vehicle-mounted battery (vehicle-mounted nonaqueous electrolyte lithium secondary battery) for a drive power supply application (typically, a motor-driving power supply application as a motive power source) and, in particular, has superior endurance with respect to high-rate charge and discharge. Therefore, according to the present invention, as shown in FIG. 7, a vehicle 1 comprising any lithium secondary battery 100 disclosed herein is provided. In particular, a vehicle 1 (for example, an automobile) comprising the lithium secondary battery 100 as a motive power source (typically, a motive power source of a hybrid vehicle or an electric vehicle) is provided.

Furthermore, as examples of favorable application objects of the technique disclosed herein include: a lithium secondary battery 100 envisioned to be possibly used in a charge-discharge cycle which includes high-rate discharges at 50 A or higher (for example, 50 A to 250 A) and further at 100 A or higher (for example, 100 A to 200 A); and a large-capacity lithium secondary battery with a theoretical capacity of 1 Ah or greater (further, 3 Ah or greater) to be used in a charge-discharge cycle which includes high-rate discharges at 10 C or higher (for example, 10 C to 50 C) and further at 20 C or higher (for example, 20 C to 40 C).

Industrial Applicability

According to the configuration of the present invention, a nonaqueous electrolyte lithium secondary battery with high endurance with respect to high-rate charge and discharge can be provided.

The invention claimed is:

1. A nonaqueous electrolyte lithium secondary battery comprising:
   a separator; and a porous layer which is formed on the separator and which includes an inorganic filler and a binder, wherein
   an average thickness of the separator ranges from 12 μm to 18 μm,
   a porosity of the separator ranges from 52% to 67%,
   an average thickness of the porous layer ranges from 3 μm to 15 μm,
   a porosity of the porous layer ranges from 44% to 70%,
   a proportion of the binder ranges from 1.1% by mass to 3.6% by mass when 100% by mass represents a total solid content of the porous layer, and
   the porous layer-attached separator exhibits a film resistance equal to or lower than 1.35 Ω·cm² when impregnated with an electrolyte solution.

2. The nonaqueous electrolyte lithium secondary battery according to claim 1, wherein the separator is made of porous polyethylene resin.

3. The nonaqueous electrolyte lithium secondary battery according to claim 1, wherein the inorganic filler is alumina or hydrated alumina.

4. A method of producing a nonaqueous electrolyte lithium secondary battery,
   the method comprising:
   a step of preparing a separator having an average thickness ranging from 12 μm to 18 μm and a porosity ranging from 52% to 67%;
   a step of coating a separator with a slurry containing an inorganic filler and a binder;
   a step of obtaining a porous layer-attached separator which has an average thickness ranging from 3 μm to 15 μm and a porosity ranging from 44% to 70% and in which a porous layer including the inorganic filler and the binder is formed on the separator by drying the slurry coating material with drying air, and
   a step of constructing a lithium secondary battery using the porous layer-attached separator, wherein
   a solid content of the slurry is set from 35% by mass to 58% by mass, a proportion of the binder in the slurry ranges from 1.1% by mass to 3.6% by mass when 100% by mass represents a total solid content for the slurry, and
   the drying of the slurry coating material is performed under a condition where a drying temperature ranges from 40° C. to 80° C. and a drying air speed ranges from 13 m/s to 27 m/s.

5. A nonaqueous electrolyte lithium secondary battery for a vehicle, which uses the porous layer-attached separator according to claim 1.

* * * * *